(12) United States Patent
Saitoh et al.

(10) Patent No.: US 7,667,876 B2
(45) Date of Patent: Feb. 23, 2010

(54) GENERATING A NORMALIZED IMAGE FROM AN ORIGINAL IMAGE

(75) Inventors: Takashi Saitoh, Kanagawa-ken (JP);
Hirobumi Nishida, Kanagawa-ken (JP);
Takeshi Suzuki, Kanagawa-ken (JP);
Takashi Akutsu, Saitma-ken (JP);
Kazutoshi Takeya, Kanagawa-ken (JP);
Hisashi Tanaka, Kanagawa-ken (JP);
Yasuyuki Ikeda, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 1002 days.

(21) Appl. No.: 11/070,086

(22) Filed: Mar. 3, 2005

(65) Prior Publication Data
US 2005/0200911 A1    Sep. 15, 2005

(30) Foreign Application Priority Data
Mar. 3, 2004    (JP)    ............... 2004-059694

(51) Int. Cl.
*H04N 1/04* (2006.01)
(52) U.S. Cl. ............ 358/474; 358/1.14; 358/1.9; 358/448; 358/500; 382/167; 382/274; 382/275; 348/223.1; 348/539
(58) Field of Classification Search ............ 358/447, 358/448, 486, 406, 527, 520, 518, 516, 515, 358/505, 504, 501, 1.2, 1.9, 2.1, 3.03, 3.06, 358/3.1, 3.23, 3.26, 3.27; 382/167, 274, 382/275, 318, 319; 348/223.1, 221.1, 539
See application file for complete search history.

(56) References Cited

U.S. PATENT DOCUMENTS

| | | | | |
|---|---|---|---|---|
| 4,977,448 A * | 12/1990 | Murata et al. | ............... | 358/530 |
| 5,282,046 A * | 1/1994 | Yamaguchi | ................ | 358/296 |
| 5,914,793 A * | 6/1999 | Suzuki et al. | ............... | 358/527 |
| 6,172,770 B1 * | 1/2001 | Inoue | ............... | 358/3.06 |
| 6,215,561 B1 * | 4/2001 | Kakutani | ............... | 358/1.9 |
| 6,441,915 B1 * | 8/2002 | Imaizumi et al. | ........... | 358/1.15 |
| 6,678,405 B1 * | 1/2004 | Kondo et al. | ............... | 382/159 |
| 6,757,083 B1 * | 6/2004 | Nakamura | ............... | 358/487 |
| 6,765,206 B2 * | 7/2004 | Sugiyama et al. | ........... | 250/330 |
| 6,870,637 B1 * | 3/2005 | Watanabe | ............... | 358/1.9 |
| 7,002,706 B2 * | 2/2006 | Sato | ............... | 358/1.2 |
| 7,016,072 B1 * | 3/2006 | Yamazaki | ............... | 358/1.9 |
| 7,123,381 B2 * | 10/2006 | Klassen | ............... | 358/1.9 |
| 7,218,421 B2 * | 5/2007 | Tsuji | ............... | 358/3.26 |
| 7,411,694 B2 * | 8/2008 | Nomizu | ............... | 358/1.16 |

(Continued)

FOREIGN PATENT DOCUMENTS

JP    04-115669    4/1992

(Continued)

OTHER PUBLICATIONS

Japanese Patent Office Communication No. 2004-059694 (8 pages).

*Primary Examiner*—Negussie Worku
(74) *Attorney, Agent, or Firm*—Dickstein Shapiro LLP

(57) ABSTRACT

An apparatus, method, system, and computer program and product, each capable of generating normalized image data from original image data are disclosed. To generate the normalized image data, feature information is extracted from the original image data, and predetermined image processing is applied to the original image data using the feature information.

3 Claims, 10 Drawing Sheets

U.S. PATENT DOCUMENTS

| | | | |
|---|---|---|---|
| 7,529,003 B2 * | 5/2009 | Fukawa | 358/505 |
| 2002/0075465 A1 * | 6/2002 | Nakamura et al. | 355/40 |
| 2004/0070797 A1 * | 4/2004 | Moritaku | 358/474 |
| 2005/0099643 A1 * | 5/2005 | Sawada et al. | 358/1.9 |
| 2007/0041027 A1 * | 2/2007 | Malik et al. | 358/1.9 |
| 2009/0185204 A1 * | 7/2009 | Wu et al. | 358/1.9 |

FOREIGN PATENT DOCUMENTS

| | | |
|---|---|---|
| JP | 04-369971 | 12/1992 |
| JP | 06-203202 | 7/1994 |
| JP | 08-098016 | 4/1996 |
| JP | 2001-341549 | 12/2000 |
| JP | 2001-014458 | 1/2001 |
| JP | 2001-197306 | 7/2001 |
| JP | 2001-333237 | 11/2001 |
| JP | 2001-153298 | 5/2004 |
| JP | 2004-153298 | 5/2004 |

* cited by examiner

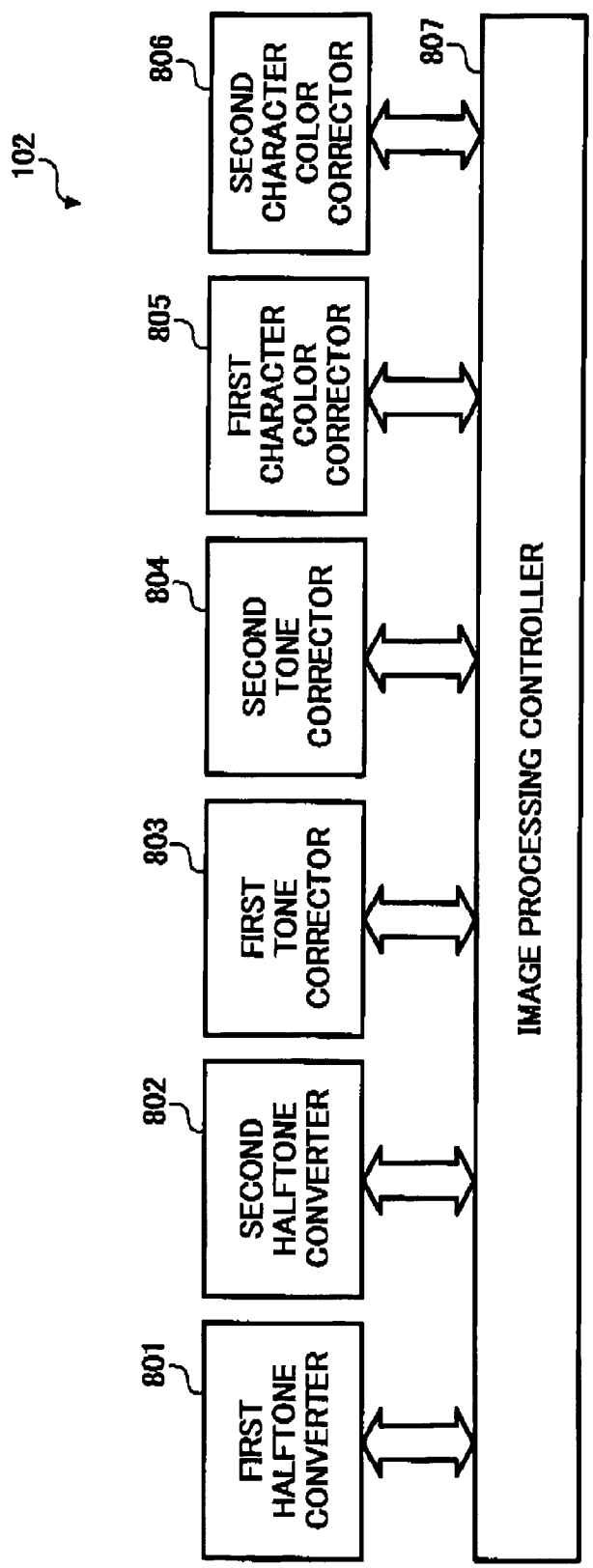

GENERATING A NORMALIZED IMAGE FROM AN ORIGINAL IMAGE

CROSS-REFERENCE TO RELATED APPLICATIONS

This patent application is based on and claims priority to Japanese patent application No. JPAP2004-059694 filed on Mar. 3, 2004, in the Japanese Patent Office, the entire contents of which are hereby incorporated by reference.

FIELD OF THE INVENTION

The present invention relates to an apparatus, method, system, and computer program and product, each capable of generating a normalized image from an original image.

DESCRIPTION OF THE RELATED ART

In today's office environment, various document management functions, including a document reading function, a document editing function, and a document outputting function, are usually performed separately in different apparati. For example, an original image may be read by a scanner, and stored as image data in a personal computer. The stored image data may be displayed using a display or may be output by a printer as a printed image. In such situations, the original image may be reproduced in lower image quality or different colors as the scanner, the display, and the printer have different characteristics from one another.

To solve this problem of characteristics differences, image processing is applied to the original image, using characteristic information obtained from each of the scanner, display, and the printer. However, such characteristic information may not be always available. Further, image processing optimal for one apparatus may not be always optimal for another apparatus.

In addition to the above-described problem, there is a problem of having the original image of lower image quality. For example, the original image may include undesired information caused during a scanning process, such as noise, abnormal illumination, geometric distortion, etc. In such a case, image processing capable of eliminating the undesired information is desired.

BRIEF SUMMARY OF THE INVENTION

Preferred embodiments of the present invention include an apparatus, method, system, and computer program and product, each capable of generating normalized image data from original image data.

In one exemplary embodiment, the normalized image data is generated using feature information. The feature information includes at least one of pixel color information, pixel frequency information, and pixel position information, of the original image data. Using the feature information, predetermined image processing is applied to the original image data to generate the normalized image data.

In another exemplary embodiment, the normalized image data is generated using feature information, which corresponds to image preference information. The feature information includes at least one of pixel color information, pixel frequency information, and pixel position information, of the original image data. Using the feature information, image processing selected based on the image preference information is applied to the original image data to generate the normalized image data.

In another exemplary embodiment, the normalized image data is generated using at least one of feature information and characteristic information. The characteristic information relates to inputting of the original image data. At least one of the feature information and the characteristic information is selected, and image processing corresponding to the selected information is applied to the original image data to generate the normalized image data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 11 is a schematic block diagram illustrating a functional structure of a server PC of FIG. 2 according to another preferred embodiment of the present invention.

DETAILED DESCRIPTION OF THE INVENTION

Figure 1:
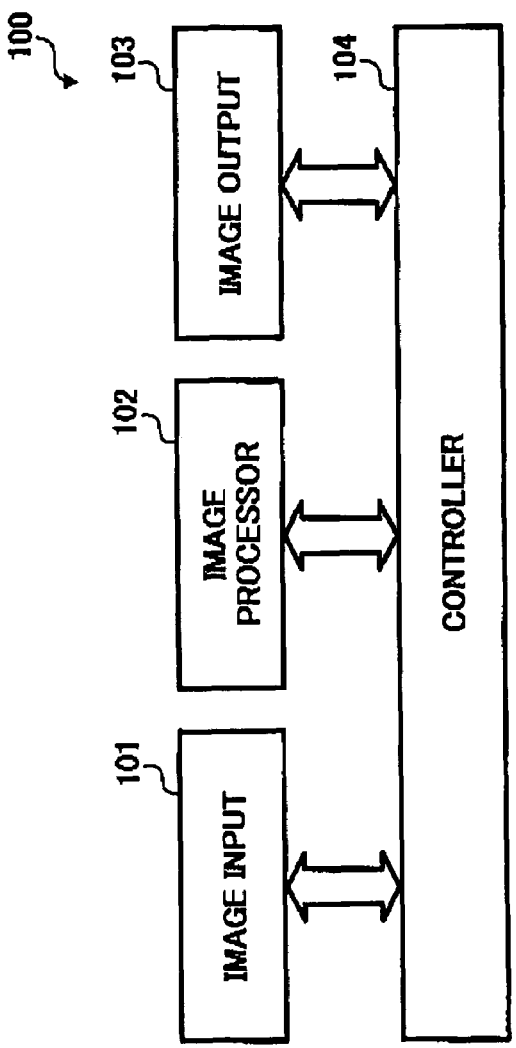
FIG. 1 is a schematic block diagram illustrating a functional structure of an image processing system according to a preferred embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a description is made of an image processing system 100 according to a preferred embodiment of the present invention.

The image processing system 100 includes an image input 101, an image processor 102, an image output 103, and a controller 104. The image input 101 includes any kind of device capable of inputting an original image as original image data. The image processor 102 includes any kind of device capable of generating normalized image data from the original image data. The image output 103 includes any kind of device capable of outputting the normalized image data. In this specification, image normalization refers to eliminating image variations, which are related to characteristics of the image input 101 but are irrelevant to object identity. The normalized image data may be generated using at least one of feature information of the original image data and characteristic information of the image input 101.

The controller 104 controls an entire operation of the image processing system 100, according to an instruction given by a user.

For example, the controller 104 may cause the image processor 102 to generate the normalized image data using the feature information extracted from the original image data. The feature information includes, for example, pixel color information, pixel frequency information, or pixel position information. In this way, image normalization may be performed independently of the characteristic information of the input image 101.

In another example, the controller 104 may obtain image preference information from a user, and cause the image processor 102 to generate the normalized image data corresponding to the image preference information. The image preference information includes information regarding a desired image quality of an output image, such as moiré suppression, improved color contrast, and improved color reproduction, for example. The image preference information may further include a desired size of an output image or a desired format of an output image. In this way, image normalization may be performed according to a user preference.

In another example, the controller 104 may obtain characteristic information from the image input 101, and cause the image processor 102 to generate normalized image data using the characteristic information. The characteristic information includes, for example, various image processing parameters, algorithms, or models, specific to an apparatus or an application program, which operates as the image input 101. In this way, image normalization may be performed, while considering the characteristic information of the image input 101.

Figure 2:
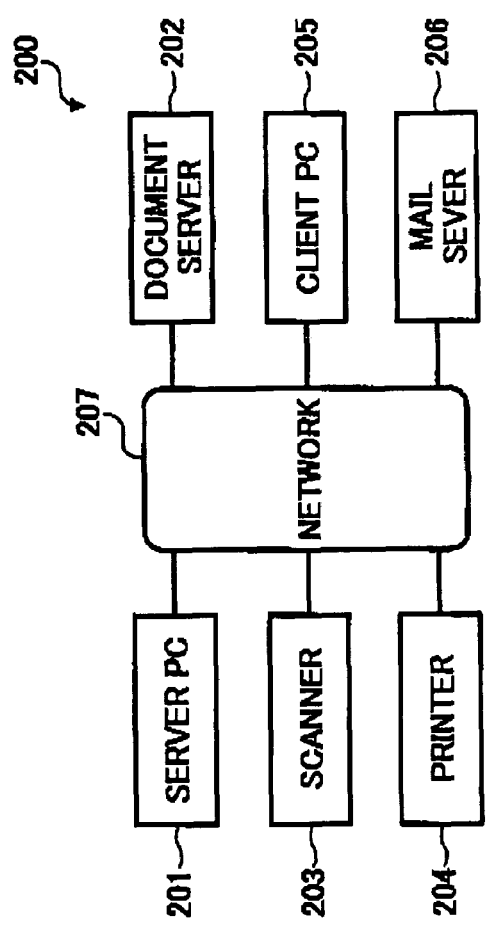
FIG. 2 is a schematic block diagram illustrating a hardware structure of an image processing system according to a preferred embodiment of the present invention.

The image processing system 100 of FIG. 1 may be implemented in various ways, for example, as illustrated in FIG. 2. The image processing system 200 of FIG. 2 includes a server PC 201, a document server 202, a scanner 203, a printer 204, a client PC 205, and a mail server 206, which are all connected via a network 207. The network 207 includes any kind of network or communication line, such as the Internet, for example.

The image processing system 200 of FIG. 2 performs various kinds of image processing operations according to a user instruction. In an exemplary operation, the scanner 203 reads an original image into original image data, and provides it to the server PC 201 via the network 207. The server PC 201 generates normalized image data from the original image data, and sends it to the client PC 205 via the network 207. The client PC 205 may display the normalized image data on a display for viewing or editing, for example. Alternatively, the client PC 205 may store the normalized image data in a storage device. Further, the client PC 205 may print out the normalized image data, using the printer 204.

In another exemplary operation, the scanner 203 reads an original image into original image data, and sends it to the server PC 201. The server PC 201 generates normalized image data from the original image data, and sends it to the printer 204, which prints the normalized image data as a printed image.

In yet another exemplary operation, the scanner 203 reads an original image into original image data, and sends it to the document server 202. The server PC 201 obtains the original image data from the document server 202, generates normalized image data from the original image data, and sends it to the mail server 206, which sends the normalized image data as email data.

As described above, the server PC 201 performs image processing of the present invention. The server PC 201 may be implemented as any kind of processor, for example, as shown in FIG. 3.

Figure 3:
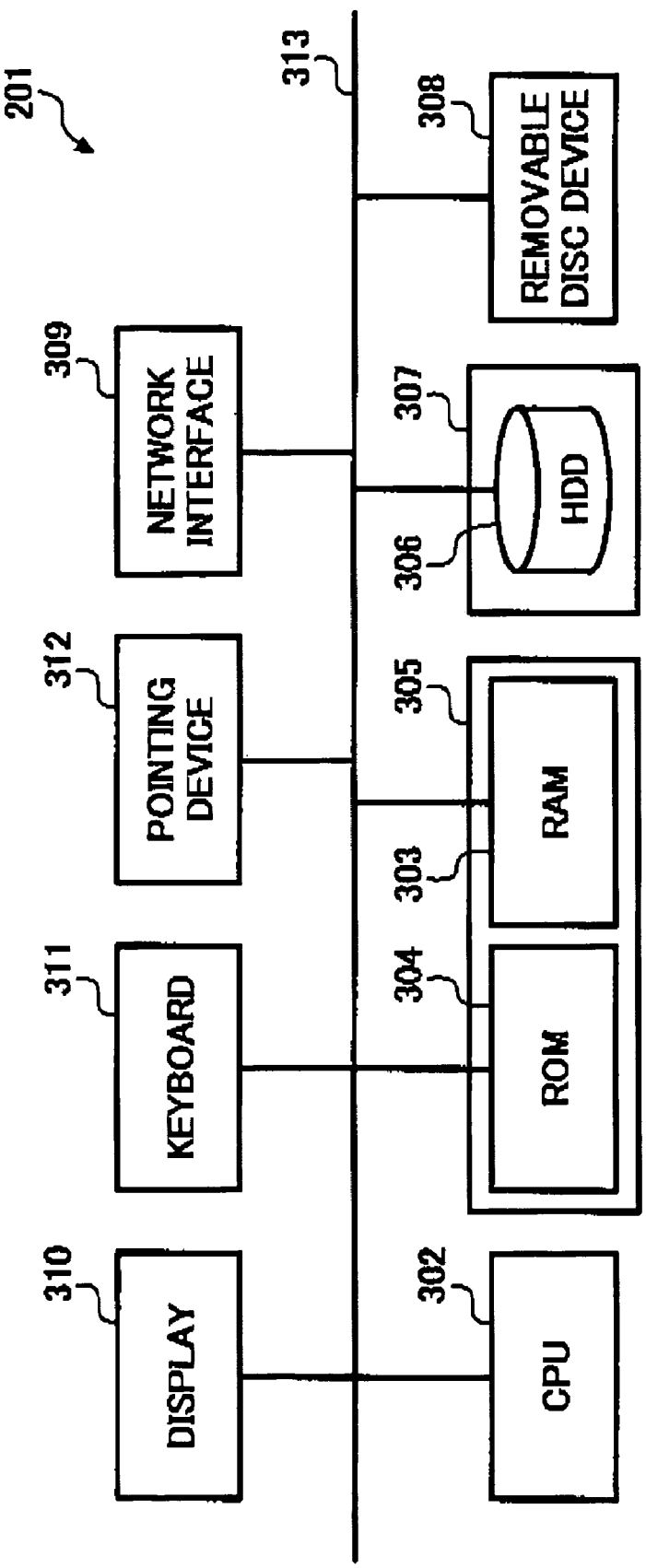
FIG. 3 is a schematic block diagram illustrating a hardware structure of a server PC of FIG. 2.

The server PC 201 of FIG. 3 includes a CPU (central processing unit) 302, a first storage device 305 including a ROM (read only memory) 304 and a RAM (random access memory) 303, a second storage device 307 including a HDD (hard disk drive) 306, a removable disc device 308, a display 310, a keyboard 311, a pointing device 312, and a network interface 309, which are all connected via a bus 313.

The CPU 302 controls an entire operation of the server PC 201. The ROM 304 includes any kind of involatile memory. The RAM 303 includes any kind of volatile memory, functioning as a work memory for the CPU 302. The HDD 306 includes any kind of storage device, capable of storing various kinds of programs including an image processing program of the present invention. The removable disc device 308 includes any kind of device capable of reading various data or programs from any kind of storage medium. The storage medium, which may store the image processing program of the present invention, includes any kind of optical disc such as CDs (compact discs) and DVDs (digital video discs), or any kind of disk such as a floppy disk and a magneto optical disk, for example. The display 310 includes any kind of display, such as a liquid crystal display, capable of displaying various data. The keyboard 311, and the pointing device 312 such as a mouse, allows a user to input instructions. The network interface 309 allows the server PC 201 to communicate with any other device via the network 207 of FIG. 2.

In an exemplary operation, when the server PC 201 is activated, the CPU 302 loads the image processing program of the present invention from the HDD 306 onto the RAM 303, and starts operating according to the image processing program.

Alternatively, the CPU 302 may download the image processing program of the present invention from the storage medium using the removable disc device 208, or it may download the image processing program from the outside via the network interface 309.

Further, the image processing program of the present invention may be operated on a predetermined operating system (OS), or may be included as a part in a group of files implementing an application software program such as a word processing program or the OS.

Still referring to FIG. 2, another exemplary configuration of the image processing system 100 is explained.

In one exemplary embodiment, the server PC 201, the document server 202, the client PC 205, and the mail server 206 are incorporated into one processor operating based on the image processing program of the present invention. In another exemplary embodiment, all of the server PC 201, the document server 202, the client PC 205, and the mail server 206 are incorporated into one processor operating based on the image processing program of the present invention. In yet another exemplary embodiment, the scanner 203 and the printer 204 are incorporated into one device, such as a multifunctional printer. In yet another exemplary embodiment, all of the devices shown in FIG. 2 are incorporated into one device, such as a multifunctional printer having a user interface.

Further, the image processing system 200 of FIG. 2 may include any number of server PCs 201, the document servers 202, the scanners 203, the printers 204, the client PCs 205, and the mail servers 206.

Figure 4:
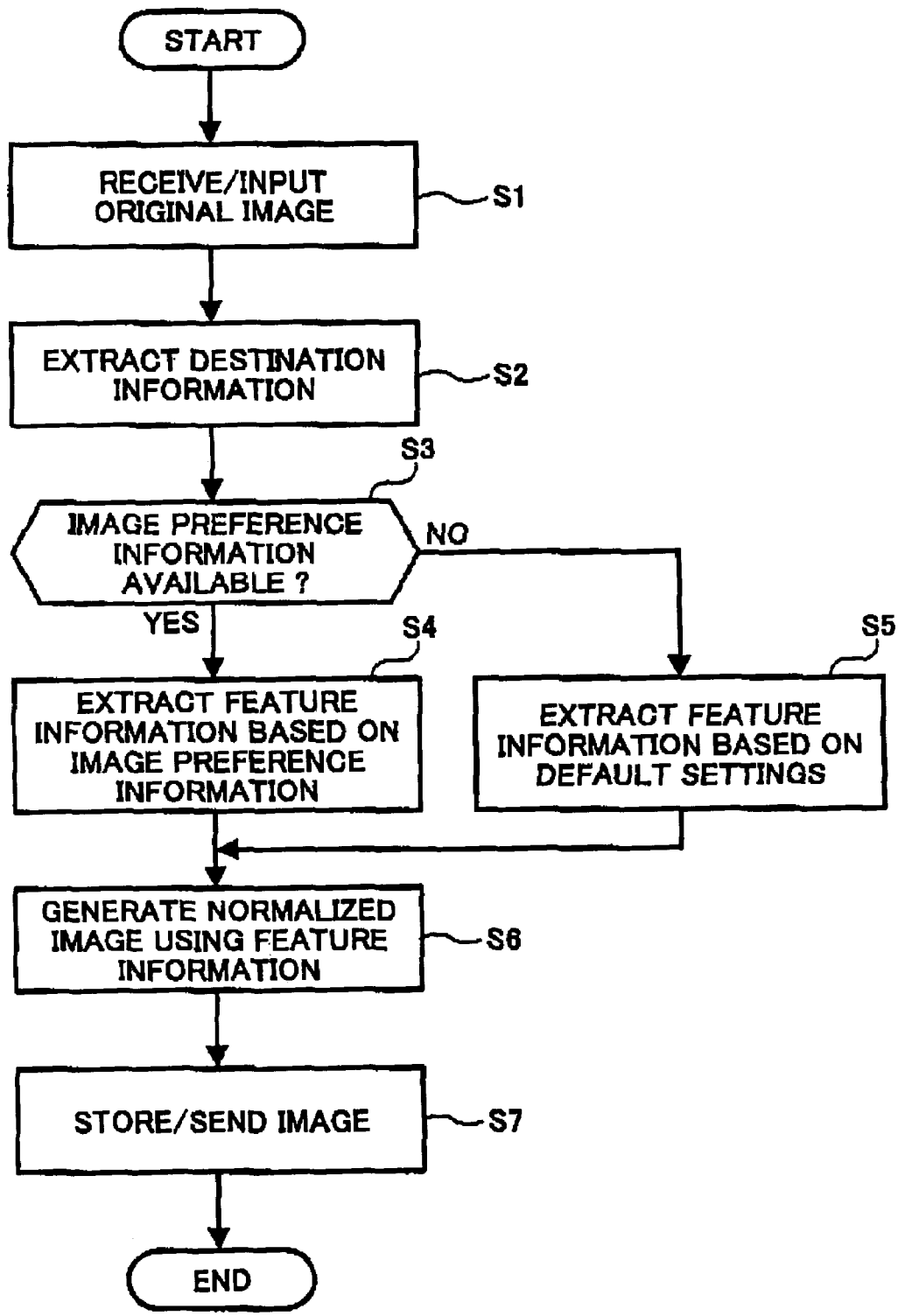
FIG. 4 is a flowchart illustrating an image processing operation performed by the image processing system of FIG. 2 according to a preferred embodiment of the present invention.

Referring now to FIG. 4, an exemplary image processing operation performed by the image processing system 200 is explained. The steps shown in FIG. 4 are performed by the server PC 201 upon receiving an instruction from the client PC 205. More specifically, the server PC 201 functions as the image processor 102 of FIG. 1.

Step S1 receives original image data from any one of the scanner 203, the document server 202, the client PC 205, and the mail server 206. Further, the original image data may be previously stored in the server PC 201.

Step S2 extracts destination information included in the user instruction received via the client PC 205. The destination information indicates a destination to which the image data is to be sent. In one example, the client PC 205 may instruct the server PC 201 to store the image data in the document server 202 as an image file for future use. In another example, the client PC 205 may instruct the server PC 201 to store the image data in the client PC 205 as an image file for image editing. In yet another example, the client PC 205 may instruct the server PC 201 to send the image data as email data to the mail server 206.

Step S3 determines whether image preference information is included in the user instruction. If the image preference information is available, the operation moves to Step S4 to extract feature information from the original image data based on the image preference information. If the image preference information is not available, the operation moves to Step S5 to extract feature information from the original image data based on default settings.

Step S6 applies image processing to the original image data, using the feature information extracted in Step S4 or S5. As a result, normalized image data is generated.

Step S7 stores or sends the normalized image data, according to the destination information obtained in Step S2, and the operation ends. In one example, the server PC 201 may store the normalized image data in one of the storage devices 305 and 307. In another example, the server PC 201 may send the normalized image data to the document server 202 for future use. In another example, the server PC 201 may send the normalized image data to the printer 204 for printing.

Figure 5:
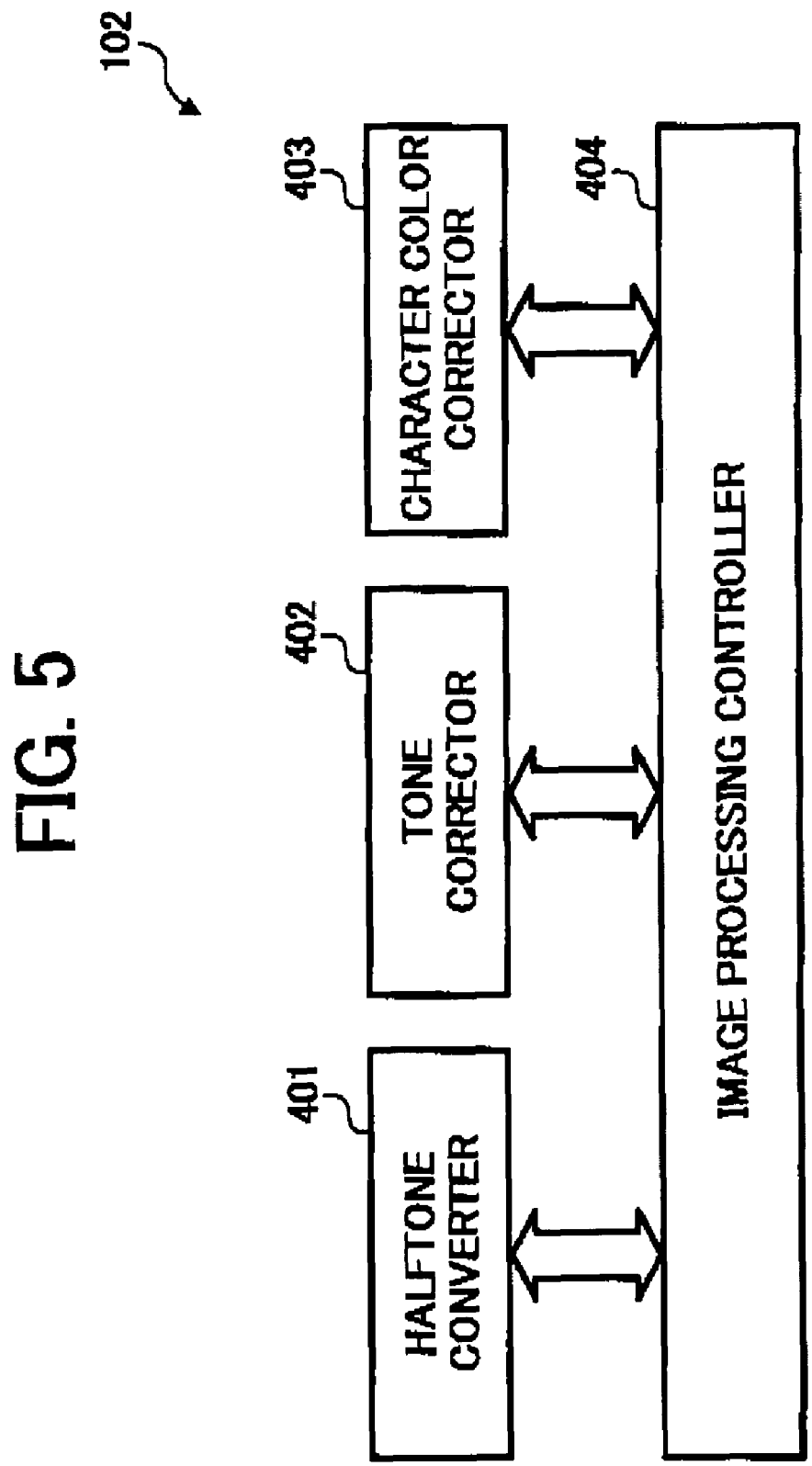
FIG. 5 is a schematic block diagram illustrating a functional structure of a server PC of FIG. 2 according to a preferred embodiment of the present invention.

Referring now to FIG. 5, an exemplary operation of generating normalized image data (Steps S4 to S6 of FIG. 4) is explained. The server PC 201, which operates as the image processor 102 of FIG. 1, may have a configuration shown in FIG. 5, for example. The image processor 102 of FIG. 5 includes a halftone converter 401, a tone corrector 402, a character color corrector 403, and an image processing controller 404.

The halftone converter 401 converts the original image data from halftone to grayscale. The tone corrector 402 adjusts color contrast between character image data and background image data in the original image data. The character color corrector 403 adjusts character color in the original image data. The image processing controller 404 selects at least one of the halftone converter 401, the tone corrector 402, and the character color corrector 403, according to image preference information. If the image preference information is not available, the image processing controller 404 of FIG. 5 selects the halftone converter 401 as a default.

Figure 6:
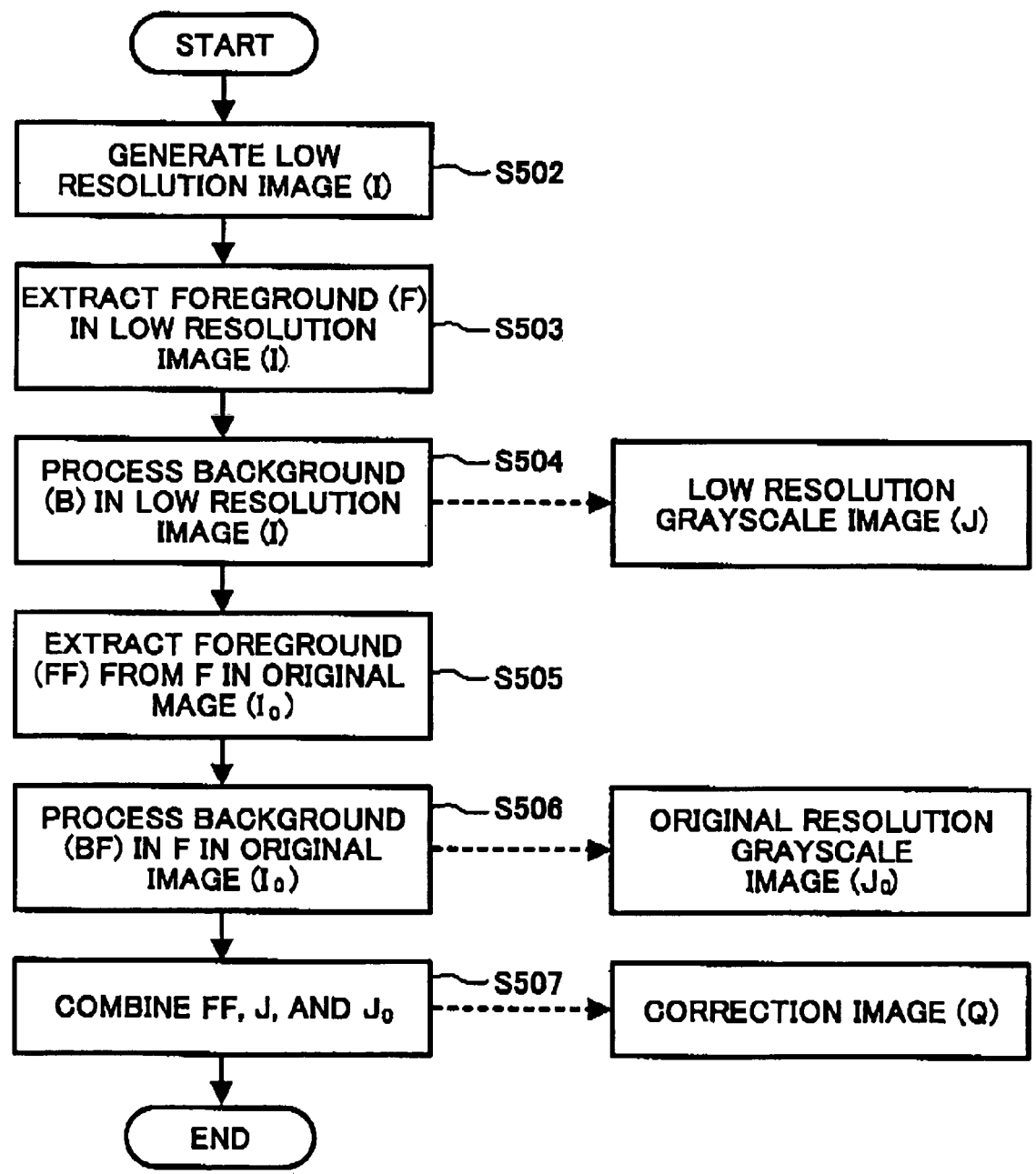
FIG. 6 is a flowchart illustrating an exemplary image processing operation performed by the server PC of FIG. 2 according to a preferred embodiment of the present invention.

The halftone converter 401 extracts feature information of original image data, and applies image processing using the feature information, as illustrated in FIG. 6, for example.

Referring to FIG. 6, Step S502 generates low resolution image data I from original image data I0. Step S503 extracts foreground image data F from the generated low resolution image data I. At the same time, background image data B is extracted. Step S504 converts the background image data from halftone to grayscale. As a result, low resolution grayscale image data J is generated. Step S505 extracts foreground image data FF from the foreground image data F, which has been extracted in Step S503. At the same time, background image data BF is extracted from the background image data B. Step S506 converts the background image data BF from halftone to grayscale. As a result, original resolution grayscale image data J0 is generated. Step S507 combines the image data FF, the image data J and the image data J0 into correction image data Q. The correction image data Q is sent or stored as the normalized image data. The image processing operation corresponding to the steps of FIG. 6 is described in U.S. Patent Application Publication No. 2003/0179409 filed on Sep. 25, 2003, the entire contents of which are hereby incorporated by reference.

Figure 7:
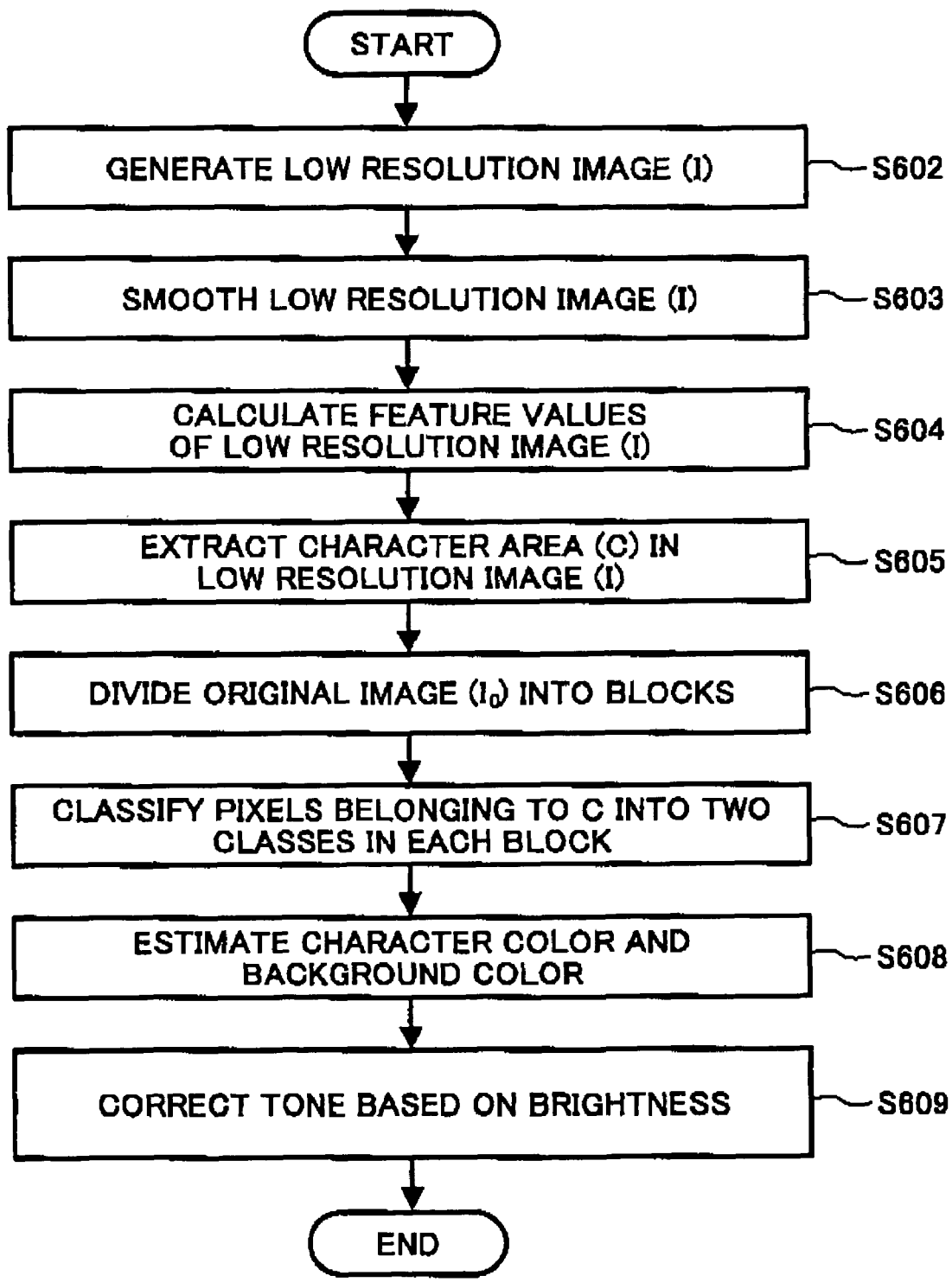
FIG. 7 is a flowchart illustrating an exemplary image processing operation performed by the server PC of FIG. 2 according to another preferred embodiment of the present invention.

The tone corrector 402 extracts feature information of original image data, and applies image processing using the feature information, as illustrated in FIG. 7, for example.

Referring to FIG. 7, Step S602 generates low resolution image data I from original image data I0. Step S603 smoothens the low resolution image data I, using a filter. Step S604 calculates feature values of the low resolution image data I, such as the brightness value of each pixel in the image data. Step S605 extracts a character area C from the low resolution image data I. Step S606 divides the original image data I0 into predetermined-sized blocks. Step S607 classifies pixels belonging to the character area C into two classes in each of the divided blocks. Step S608 estimates a character color and a background color according to statistics of brightness, using the feature values. Step S609 corrects tone of each of the pixels according to the reference value calculated from the statistics of brightness. The image processing operation corresponding to the steps of FIG. 7 is described in U.S. Patent Application Publication No. 2004/0076337 filed on Apr. 22, 2004, the entire contents of which are hereby incorporated by reference.

Figure 8:
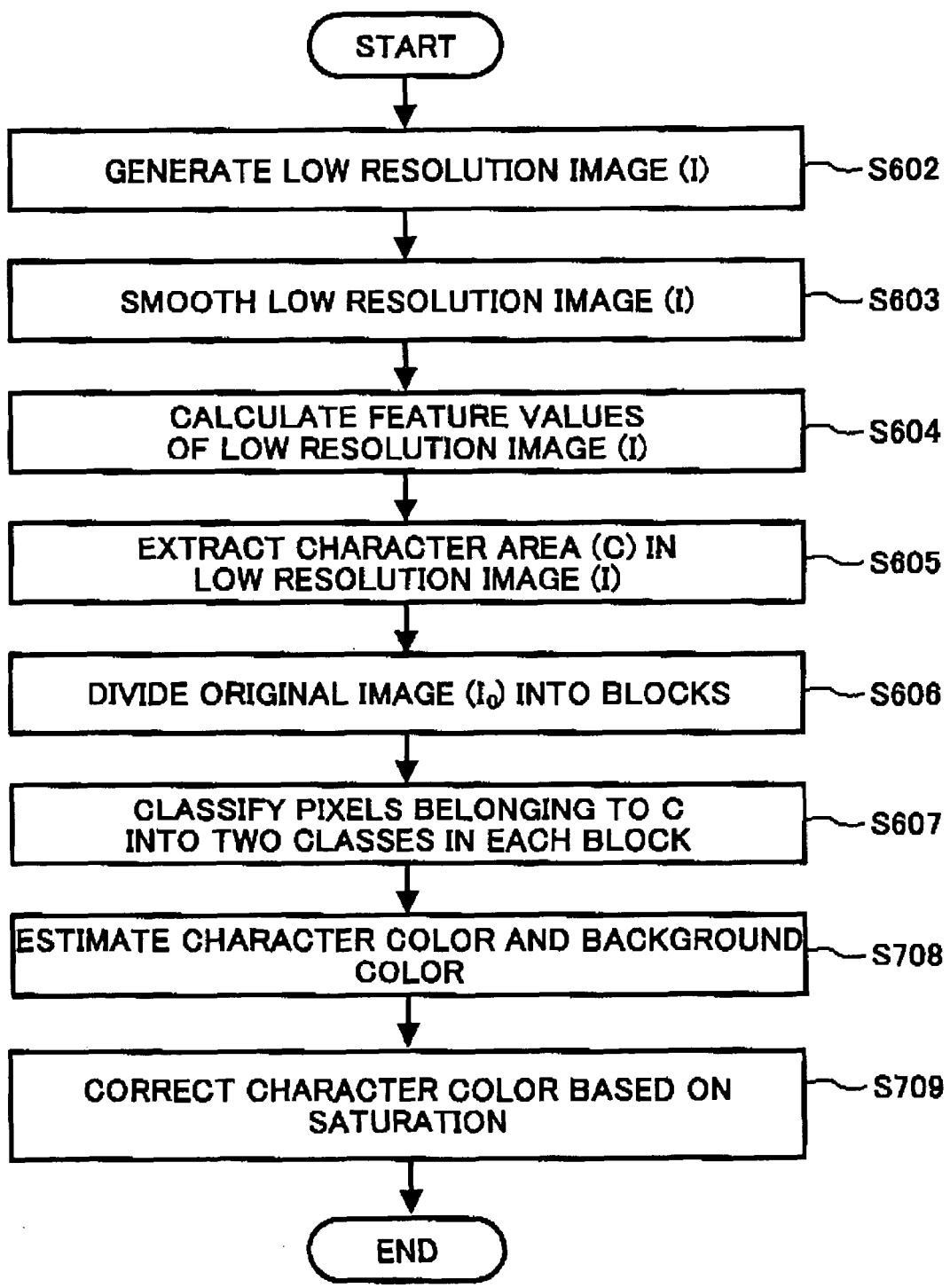
FIG. 8 is a flowchart illustrating an exemplary image processing operation performed by the server PC of FIG. 2 according to another preferred embodiment of the present invention.

The character color corrector 403 extracts feature information of original image data, and applied image processing based on the feature information, as illustrated in FIG. 8, for example.

Step S708 of FIG. 8 is substantially similar in operation to Step S608 of FIG. 7, except that the character color and the background color are estimated according to statistics of saturation. The saturation value for each of the character pixels may be calculated using the equation: $(r+g+b)/3 - \min(r, g, b)$, with r, g, and b indicating R, G, and B signal values, respectively. The average value and the standard deviation of the saturation values are then obtained as the statistics of saturation.

Step S709 corrects a character color of each pixel according to the reference value calculated from the statistics of saturation. For example, the saturation of each of the character pixels is compared with the reference value, which is a threshold value set based on the statistics of saturation. If the saturation of a target pixel is equal to or below the reference value, color of the target pixel is adjusted to be a character color.

Figure 9:
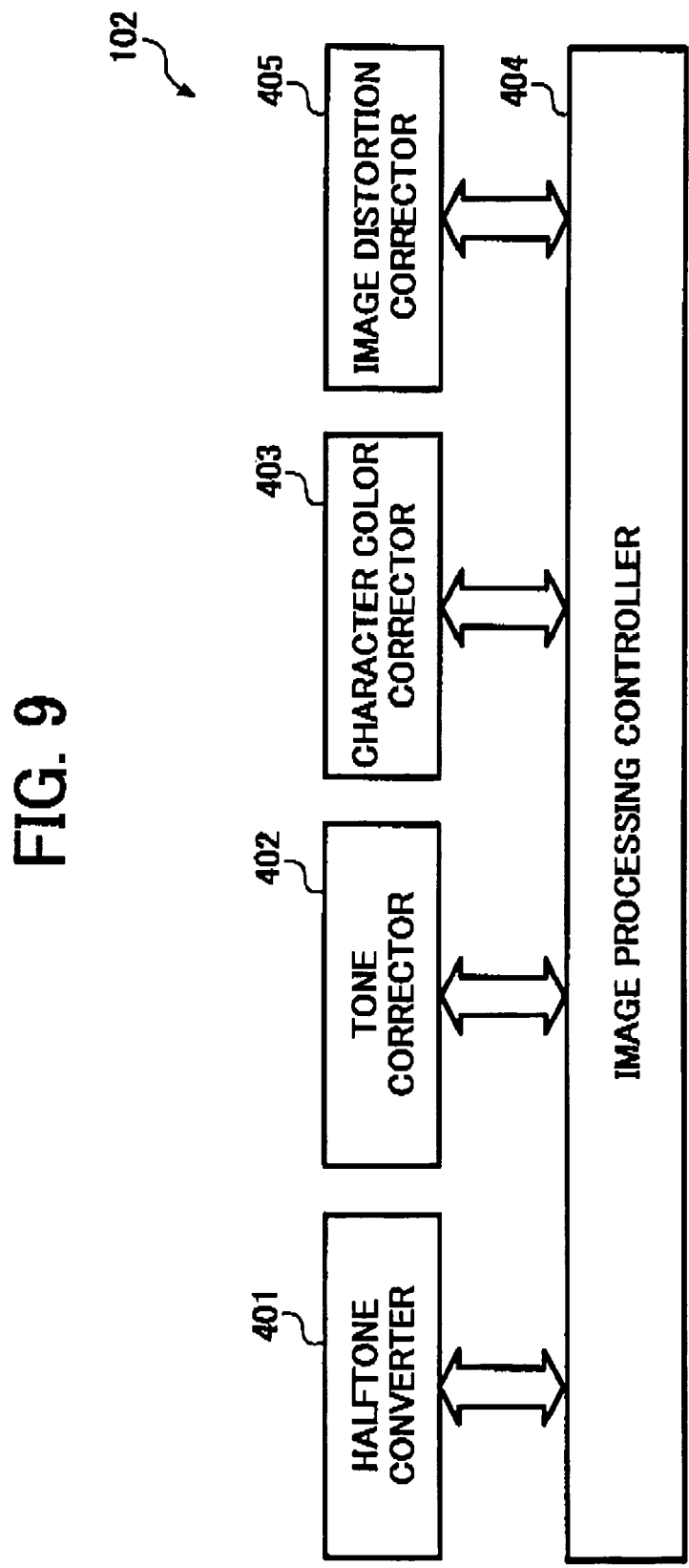
FIG. 9 is a schematic block diagram illustrating a functional structure of a server PC of FIG. 2 according to another preferred embodiment of the present invention.

FIG. 9 illustrates another configuration of the server PC 201, which operates as the image processor 102. The image processor 102 of FIG. 9 includes an image distortion corrector 405, in addition to the halftone converter 401, the tone corrector 402, the character color corrector 403, and the image processing controller 404. The image distortion corrector 405 corrects image distortion, caused during scanning by the image input 101, for example. The image distortion corrector 405 extracts feature information of original image data, and applies image processing using the feature information, as disclosed in U.S. Pat. No. 5,854,854 filed on Sep. 24, 1997, the entire contents of which are hereby incorporated by reference, or in U.S. Patent Application Publication No. 2003/0198398 filed on Feb. 6, 2003, the entire contents of which are hereby incorporated by reference.

Figure 10:
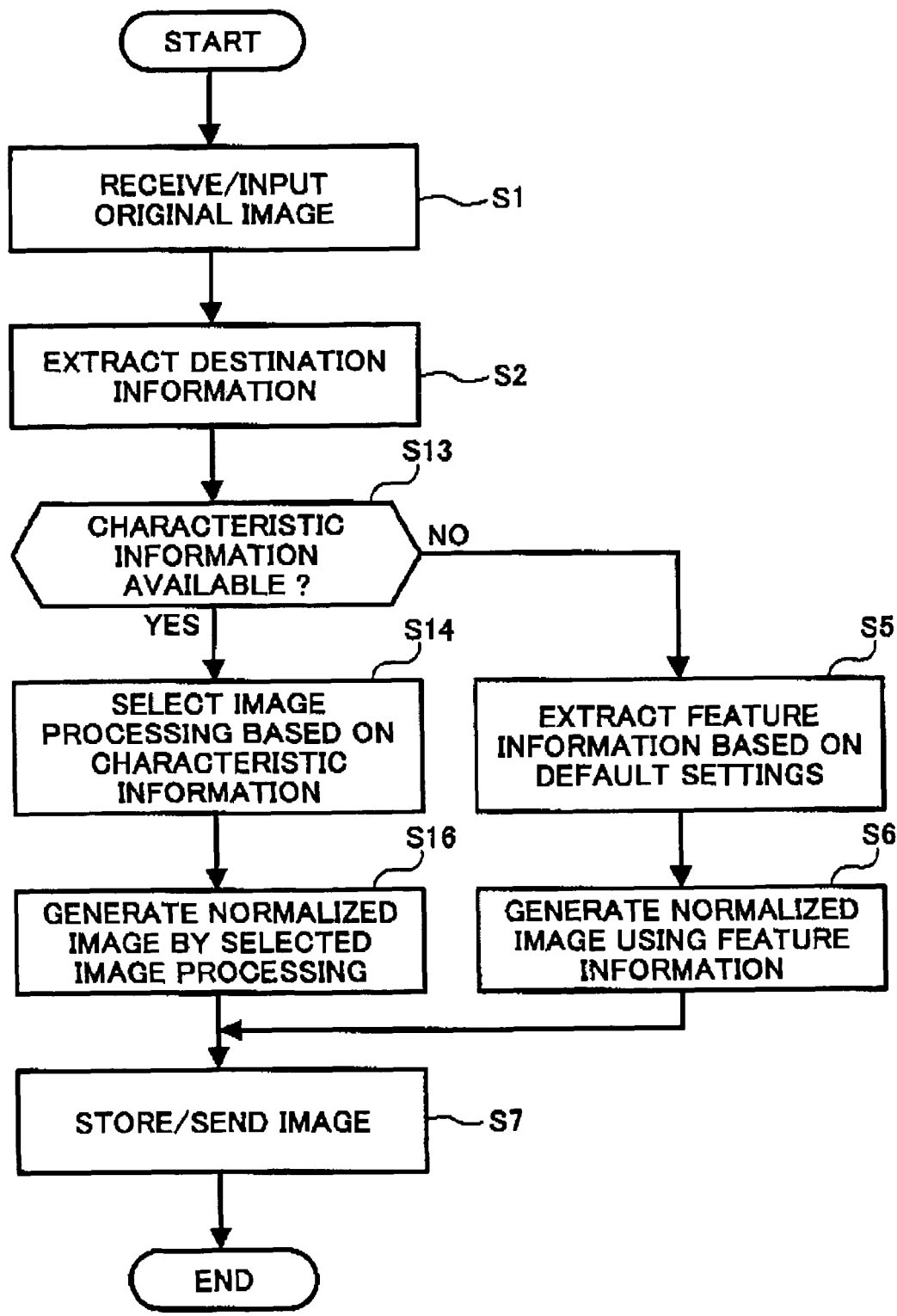
FIG. 10 is a flowchart illustrating an image processing operation performed by the image processing system of FIG. 2 according to another preferred embodiment of the present invention.

Referring now to FIG. 10, another exemplary image processing operation performed by the image processing system 200 is explained. The steps shown in FIG. 10 are performed by the server PC 201 upon receiving an instruction from the client PC 205.

Step S13 determines whether characteristic information is available from the scanner 203. If the characteristic information is available, the operation moves to Step S14 to select image processing, such as image processing algorithms or parameters, corresponding to the characteristic information. If the characteristic information is not available, the operation moves to Step S5 to extract feature information from the original image data based on the default settings, and to Step S6 to generate normalized image data using the feature information.

Step S16 applies image processing, selected in Step S14, to the original image data. The processed image data is then stored or sent to the destination in Step S7.

FIG. 11 illustrates another exemplary configuration of the server PC 201, which operates as the image processor 102 of FIG. 1. Referring to FIG. 11, an exemplary operation of selecting and applying image processing to the original image data based on the characteristic information (Steps S14 and S16 of FIG. 10) is explained. The image processor 102 of FIG. 11 includes a first halftone converter 801, a second halftone converter 802, a first tone corrector 803, a second tone corrector 804, a first character color corrector 805, a second character color corrector 806, and an image processing controller 807.

The first halftone converter 801, the first tone corrector 803, and the first character color corrector 805 operate in a substantially similar manner to the halftone converter 401, the tone corrector 402, and the character color corrector 403, respectively.

The second halftone converter 802 converts original image data from halftone to grayscale, using the characteristic information of the scanner 203. For example, the second halftone converter 802 may perform an image processing operation described in the U.S. Pat. No. 5,825,937 filed on Mar. 27, 1997, the entire contents of which are hereby incorporated by reference. In another example, the second halftone converter 802 may perform an image processing operation using a frequency characteristic of the scanner 203.

The second tone corrector 804 adjusts color contrast between character image data and background image data in original image data, using characteristic information. For example, the second tone corrector 804 may perform scanner gamma correction using a gamma correction table of the scanner 203.

The second character color corrector 806 adjusts character color in original image data, using characteristic information. For example, the second character color corrector 806 may perform an image processing operation using a frequency characteristic of the scanner 203.

In an exemplary operation, the image processing controller 807 selects the first halftone converter 801 when the characteristic information is not known, while it selects the second halftone converter 802 when the characteristic information is known. Similarly, the image processing controller 807 may select at least one of the first tone correctors 803 and 804, or at least one of the first character color correctors 805 and 806, depending on the availability of the characteristic information.

In another exemplary operation, the image processing controller 807 selects at least one of the first and second halftone converters 801 and 802, at least one of the first tone correctors 803 and 804, or at least one of the first character color correctors 805 and 806, according to a user preference.

Numerous additional modifications and variations are possible in light of the above teachings. It is therefore to be understood that within the scope of the appended claims, the disclosure of this patent specification may be practiced otherwise than as specifically described herein.

For example, elements and/or features of different illustrative embodiments may be combined with each other and/or substituted for each other within the scope of this disclosure and appended claims.

What is claimed as new and desired to be protected by Letters Patent of the United States is:

1. An image processing apparatus, comprising:
   an image input configured to input original image data obtained by an image input device;
   an image processor provided independently from the image input device and configured to extract feature information of the original image from the original image data, and to generate normalized image data using the feature information by selecting image processing to be applied to the original image data based on the feature information without requiring characteristic information indicating the characteristics of the image input device, and applying the selected image processing to remove image variations from the original image data caused by the characteristics of the image input device, wherein the image processor includes:
   an image processing controller configured to select at least one of a plurality of sub-processors and to cause the selected sub-processor to apply the image processing to generate the normalized image data, the sub-processors including:
   a halftone converter configured to convert the original image data from halftone to continuous tone using the feature information when selected by the image processing controller;
   a tone corrector configured to adjust color contrast in the original image data using the feature information when selected by the image processing controller;
   a character color corrector configured to adjust character color in the original image data using the feature information when selected by the image processing controller; and
   an image distortion corrector configured to correct image distortion in the original image data using the feature information when selected by the image processing controller; and
   an image output configured to output the normalized image data through an image output device.

2. The apparatus of claim 1, wherein the image processing controller is further configured to:

determine whether image preference information regarding a user preference for an output of the original image data is obtained from a user, wherein the image processing controller selects the sub-processor based on the image preference information when the image preference information is obtained.

3. The apparatus of claim 1, wherein the image processing controller is further configured to:

determine whether characteristic information indicating characteristics of the image input device is available from the image input device, wherein the image processing controller selects the sub-processor based on the characteristic information when the characteristics information is obtained.

* * * * *

UNITED STATES PATENT AND TRADEMARK OFFICE
CERTIFICATE OF CORRECTION

| | |
|---|---|
| PATENT NO. | : 7,667,876 B2 |
| APPLICATION NO. | : 11/070086 |
| DATED | : February 23, 2010 |
| INVENTOR(S) | : Saitoh et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1392 days.

Signed and Sealed this

Fourth Day of January, 2011

David J. Kappos
*Director of the United States Patent and Trademark Office*